(12) United States Patent
Balasubramanian et al.

(10) Patent No.: US 12,266,005 B2
(45) Date of Patent: Apr. 1, 2025

(54) IDENTIFYING CANDIDATE REPLACEMENT ITEMS WITH A SOURCE SIMILARITY SCORE

(71) Applicant: Maplebear Inc., San Francisco, CA (US)

(72) Inventors: Ramasubramanian Balasubramanian, San Francisco, CA (US); Lynn Fink, Chicago, IL (US); Alexandra Hart, Hinsdale, IL (US); Sanam Alavizadeh, Chicago, IL (US); Lauren Scully, San Francisco, CA (US); Samuel Lederer, Brooklyn, NY (US); Anna Vitti, Brooklyn, NY (US); Lukasz Czekaj, North Las Vegas, NV (US); Joseph Olivier, San Bruno, CA (US); Michael Prescott, Berkeley, CA (US); Jeong Eun Woo, Manhasset, NY (US); Nicole Yin Chuen Lee Altman, Honolulu, HI (US)

(73) Assignee: Maplebear Inc., San Francisco, CA (US)

( * ) Notice: Subject to any disclaimer, the term of this patent is extended or adjusted under 35 U.S.C. 154(b) by 204 days.

(21) Appl. No.: 18/072,316

(22) Filed: Nov. 30, 2022

(65) Prior Publication Data
US 2024/0177211 A1  May 30, 2024

(51) Int. Cl.
*G06Q 30/06* (2023.01)
*G06Q 30/0601* (2023.01)
*G06Q 30/08* (2012.01)

(52) U.S. Cl.
CPC ..... *G06Q 30/0631* (2013.01); *G06Q 30/0629* (2013.01); *G06Q 30/08* (2013.01)

(58) Field of Classification Search
None
See application file for complete search history.

(56) References Cited

U.S. PATENT DOCUMENTS 8,195,527 B2 * 6/2012 Chowdhary ........... G06Q 10/06
705/26.7
8,301,623 B2 * 10/2012 Chakrabarti ........ G06F 16/9535
707/723

(Continued)

OTHER PUBLICATIONS

Li, Q., "Market Discipline, Integrity, Information Disclosure and Financial Misconduct," dissertation, Michigan State University, 2018. (Year: 2018).*

(Continued)

*Primary Examiner* — Nicholas D Rosen
(74) *Attorney, Agent, or Firm* — Fenwick & West LLP

(57) ABSTRACT

An online concierge system suggests replacement items when an ordered item may be unavailable. To promote similarity of sources between the replacement item with the ordered item, candidate replacement items are scored, in part, based on a source similarity score based on a source of the candidate replacement item and a source of the ordered item. The source similarity score may be determined by a computer model based on user interactions with item sources. The similarity score may be based on source embeddings that may be determined based on respective item embeddings or may be determined by training source embeddings directly from user-source interactions. The similarity score for a candidate replacement item may be combined with a replacement score indicating the user's likelihood of selecting the candidate replacement item as a replacement to yield a total score for selection as suggestion as a replacement for the ordered item.

18 Claims, 7 Drawing Sheets

(56) References Cited

U.S. PATENT DOCUMENTS

| | | | |
|---|---|---|---|
| 8,548,940 B1* | 10/2013 | Rajaram | G06F 16/2308 |
| | | | 707/684 |
| 8,903,834 B2* | 12/2014 | Ciancutti | G06F 16/435 |
| | | | 725/44 |
| 10,664,534 B2* | 5/2020 | Surya | G06F 16/9532 |
| 11,585,892 B1* | 2/2023 | Spaulding | G01S 7/4021 |
| 11,803,891 B2* | 10/2023 | Pawar | G06Q 30/0637 |
| 12,008,622 B2* | 6/2024 | Cho | G06Q 30/0641 |
| 2008/0294617 A1 | 11/2008 | Chakrabarti et al. | |
| 2010/0023340 A1* | 1/2010 | Chowdhary | G06Q 30/02 |
| | | | 705/1.1 |
| 2012/0096013 A1 | 4/2012 | Ciancutti et al. | |
| 2013/0182686 A1* | 7/2013 | Vedantham | H04W 28/0958 |
| | | | 370/336 |
| 2014/0136549 A1* | 5/2014 | Surya | G06F 16/9535 |
| | | | 707/749 |
| 2015/0066626 A1* | 3/2015 | Farahat | G06Q 30/0242 |
| | | | 705/14.41 |
| 2015/0199222 A1* | 7/2015 | Day-Richter | G06F 9/547 |
| | | | 719/330 |
| 2021/0233143 A1* | 7/2021 | Cho | G06Q 30/0641 |
| 2021/0318812 A1* | 10/2021 | Lidman | G06F 3/0622 |
| 2022/0114640 A1 | 4/2022 | Pawar | |
| 2022/0319658 A1* | 10/2022 | Abraham | C12Q 1/6886 |
| 2023/0196436 A1* | 6/2023 | Shatdarshanam Venkata | |
| | | | G06Q 10/0875 |
| | | | 705/26.7 |
| 2024/0289855 A1* | 8/2024 | Balasubramanian | G06N 3/08 |

OTHER PUBLICATIONS

PCT International Search Report and Written Opinion, PCT Application No. PCT/US2023/33837, Feb. 22, 2024, 7 pages.

* cited by examiner

US 12,266,005 B2

IDENTIFYING CANDIDATE REPLACEMENT ITEMS WITH A SOURCE SIMILARITY SCORE

BACKGROUND

This disclosure relates generally to ordering an item through an online concierge system, and more specifically to identifying candidate replacement items for an ordered item by the online concierge system.

In current online concierge systems, shoppers (or "pickers") fulfill orders at a physical warehouse, such as a retailer, on behalf of users as part of an online shopping concierge service. In current online concierge systems, the shoppers may be sent to various warehouses with instructions to fulfill orders for items, and the pickers then find the items included in the user order in a warehouse. Item inventory at a warehouse may fluctuate throughout a day or week, so a shopper may be unable to find an item ordered by a user at a warehouse.

To account for varying availability of an item that a user ordered at a warehouse, an online shopping concierge service may prompt a user to identify a replacement item for the item. However, appropriately selecting and suggesting such replacement items may be difficult to effectively provide to the user while balancing other effects. Having already selected items for purchase, the user may prefer to have similar items or items from a similar source (e.g., a brand, manufacturer, company, etc.) to replace the unavailable item, and the source itself may prefer its items not be used to suggest replacement by other sources. In addition, the item being replaced may be associated with a previous advertisement or other prioritization of item presentation that influenced the user's original selection of that item. Recommending replacement items from a different entity may mean that the unavailable item (presented and selected by the user for the order in part due to the advertisement) may lead to a purchase for a competitor's product (e.g., associated with a different source).

As such, there is a need to provide suggested replacement items that can both propose items that the user is likely to accept as a replacement and that account for possible differences in item source between the ordered item and the items suggested as a replacement.

SUMMARY

An online concierge system receives a delivery order from a user through an interface, such as one presented by an application executing on a user's client device. The order identifies one or more items the user seeks to purchase via the online concierge system. Additionally, the order may identify a delivery location where the identified one or more items are to be delivered. The order also identifies a warehouse from which the identified one or more items are to be obtained. One or more of the items included in the order may have limited inventory at the warehouse identified by the order. To account for an item included in the order being unavailable at the warehouse identified by the order, the online concierge system allows the user to specify a replacement item for an item in the order, authorizing a shopper fulfilling the order to obtain the replacement item if the item is unavailable at the warehouse identified by the order.

To suggest replacement items for an ordered item, the online concierge system identifies candidate replacement items and scores each candidate replacement item with a replacement score indicating a likelihood that the candidate replacement item would be selected by the user as a replacement for the ordered item, and a source similarity score indicating a similarity of a source of the ordered item with respect to a source of the candidate replacement item. The source of an item may refer to an origin, brand, company, or other entity with which the item is associated. In general, the source similarity score may thus preference items having the same source as the ordered item and penalize items having a different source, encouraging similarity between source of the ordered item and the items suggested as replacements for it.

In embodiments in which the source similarity score is a value from zero to one, the source similarity score may thus have the value of one for candidate replacement items having the same source as the ordered item. The source similarity score may be based on a trained model that predicts the similarity of two sources, which in some configurations may include evaluating a source embedding of the ordered item and a source embedding of the candidate replacement items. The source embedding for a source may be based on item embeddings of the items associated with the source (e.g., by averaging) or may be trained based on based on user-item interactions with items associated with the source, such that the source embeddings may be trained directly based on the user-item interactions.

The source similarity score and replacement score may then be combined to a total score for a candidate replacement item and used to select the replacement items suggested to the user to select if or when the ordered item is out of stock. Accordingly, the source similarity score may operate to encourage selection of the same source in the replacement item process, while allowing for, but penalizing, selection of an item having a different source. In some configurations, the total score may also be based on a bid. When an ordered product was selected as a result of an advertisement, this advantage for the source of an originally-ordered item may reduce the likelihood that substitute products are recommended from alternate or competing sources. As users often also have preferred sources (reflected in an actually-ordered item), this may increase the likelihood that the source preference is maintained in suggesting items from the same source as the ordered item while allowing items with a high replacement score to be suggested.

The online concierge system displays the suggested replacement item to the user, allowing the user to approve the replacement item as a potential replacement for the ordered item. For example, the online concierge system displays the replacement item and the ordered item to the user via an interface displayed by an application executing on a client device of the consumer. In response to receiving an authorization from the user to replace the ordered item with the selected replacement item, the online concierge system stores an indication in association with the user that the user has authorized replacement of the ordered item with the selected replacement item if the ordered item is unavailable. This stored indication simplifies fulfillment of the received order by a shopper, allowing the shopper to replace the ordered item with the selected replacement item without communicating with the user if the ordered item is unavailable.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Architecture

Figure 1:
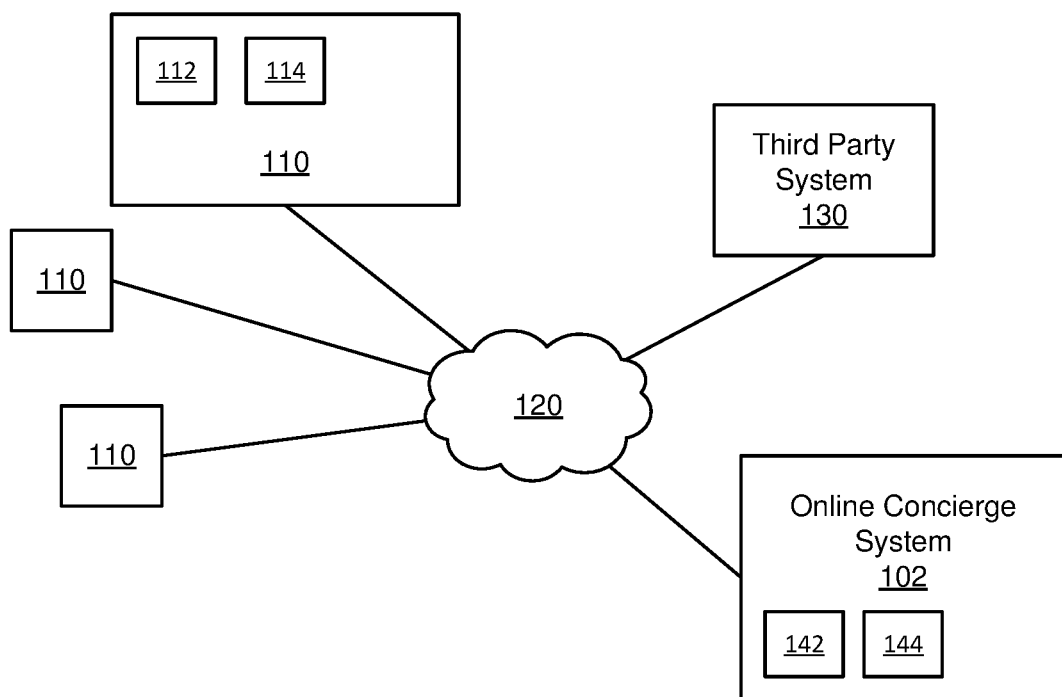
FIG. 1 is a block diagram of a system environment in which an online system, such as an online concierge system, operates, according to one embodiment.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 4A and 4B, respectively.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described, e.g., in conjunction with FIGS. 2 and 5-7. For example, the memory 144 has instructions encoded thereon that, when executed by the processor 142, cause the processor 142 to evaluate candidate replacement items and suggest a replacement item for an ordered item in a user order. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device, a third-party system 130, or the online concierge system 102 may be special purpose computing devices configured to perform specific functions, as further described below in conjunction with FIGS. 2-7, and may include specific computing components such as processors, memories, communication interfaces, and/or the like.

System Overview

Figure 2:
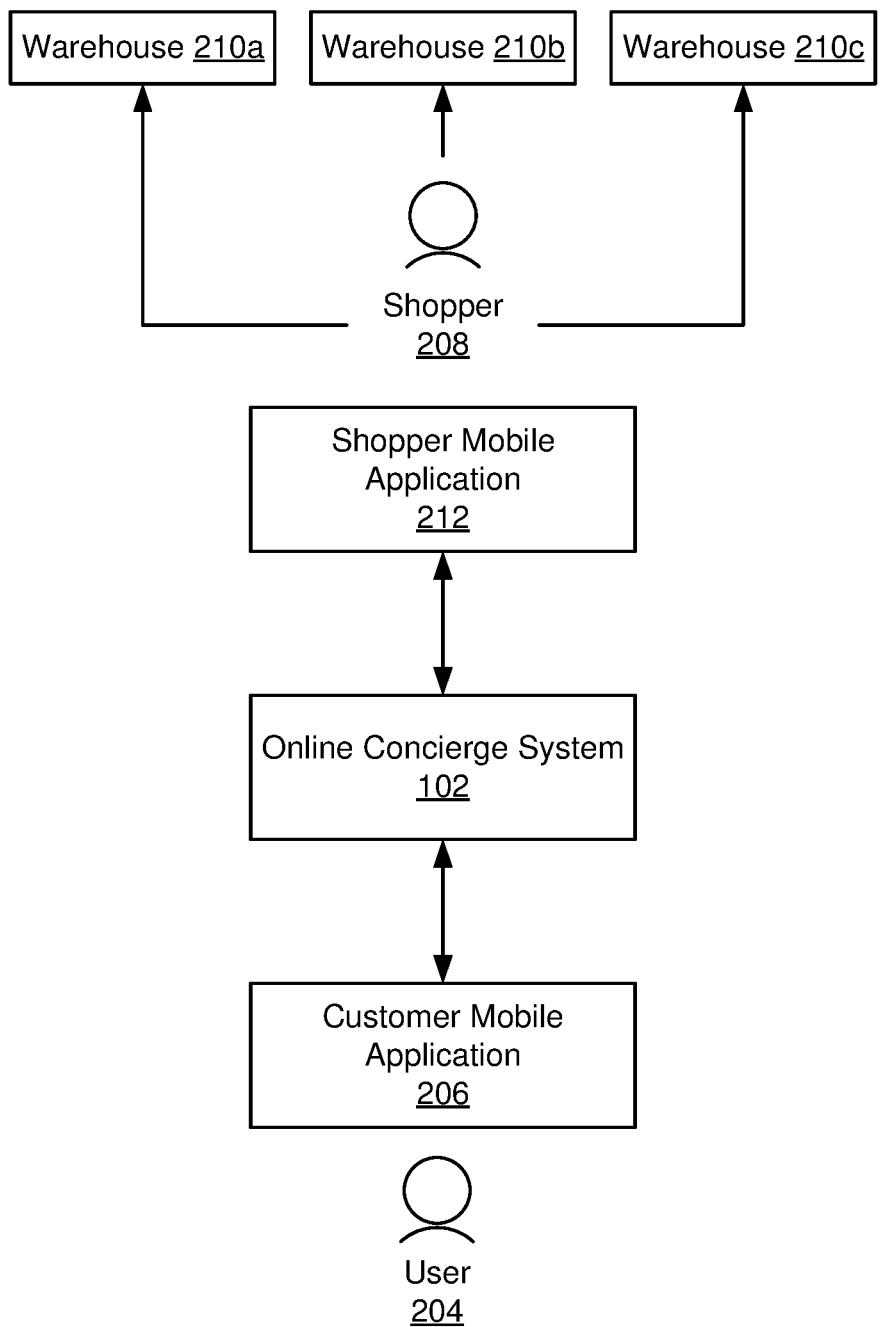
FIG. 2 illustrates an environment of an online platform, such as an online concierge system, according to one embodiment.

FIG. 2 illustrates an environment 200 of an online platform, such as an online concierge system 102, according to one embodiment. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 102. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one embodiment, shoppers 208 make use of a shopper mobile application 212 which is configured to interact with the online concierge system 102.

Figure 3:
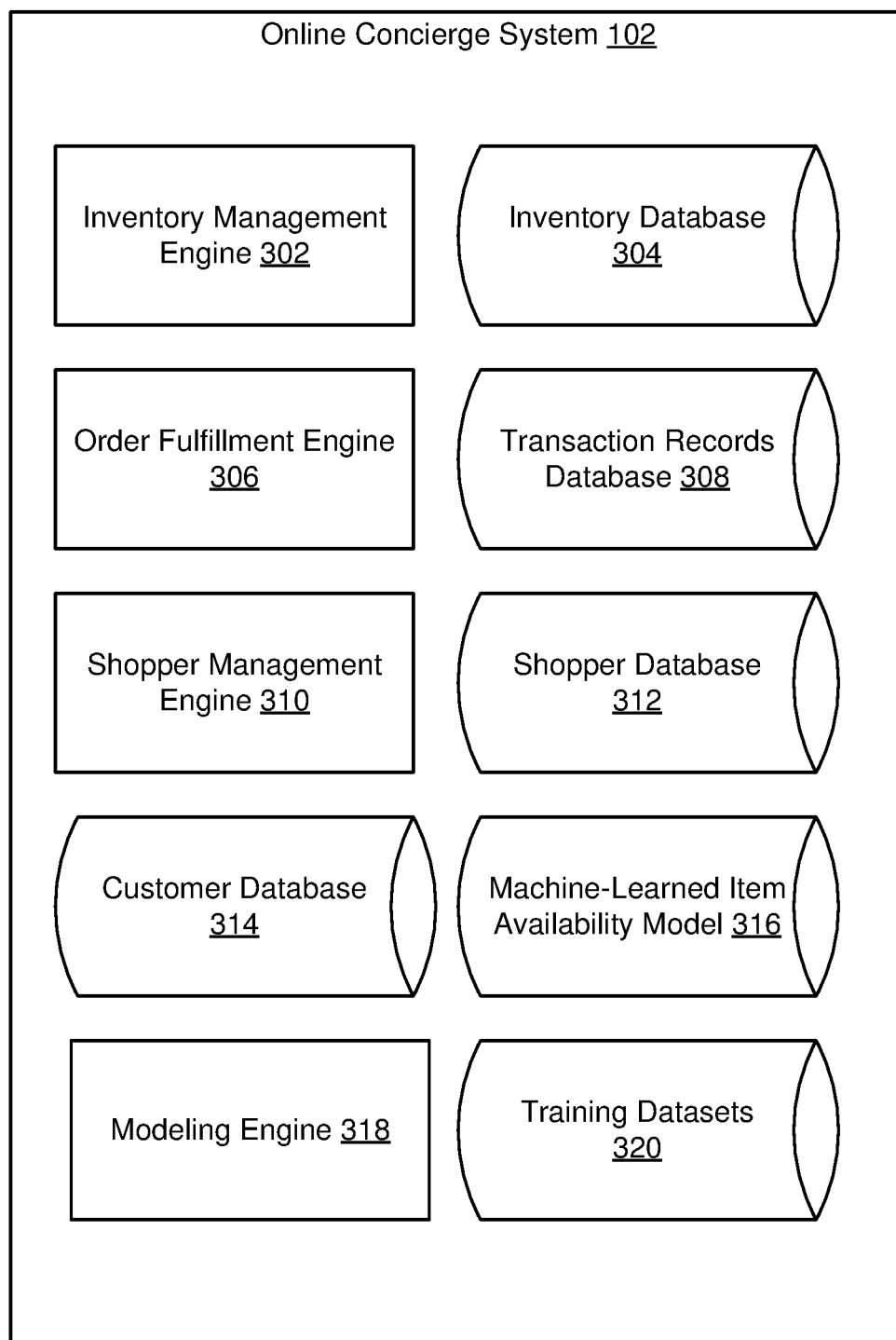
FIG. 3 is a diagram of an online concierge system, according to one embodiment.

FIG. 3 is a diagram of an online concierge system 102, according to one embodiment. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one embodiment, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, stock-keeping unit (SKU), serial number, and so on. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different attributes for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210. Different levels in the taxonomy provide different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., lower levels include a fewer number of items satisfying a more specific category).

The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 304 with an item availability predicted by the machine learning item availability model 316. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one embodiment, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application 206. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, when a user creates an order via the search interface, the items provided to the user for inclusion in the order may include items responsive to the query and/or items provided based on advertisements or other promotions that may be operated by advertisers. The items provided to a user may include items that may be selected based, in part, on an associated advertisement that may increase the likelihood the item is provided to the user, and may be provided in dedicated display areas for promoted items. The advertised items may be provided to users in different ways in various embodiments, and may generally increase the likelihood that the advertised item is presented to a user. The associated advertiser may then provide a value responsive to the advertised product. To select items, the online concierge system 102 (e.g., via the order fulfillment engine 306), may execute an auction among the advertised items based on associated bids, or may otherwise incorporate/determine a value for promoting the item to a particular user and receive the value from the advertiser for providing the item to the user due, in part, to the promotion. As such, items in a user's order may include items that were provided to the user based on the advertisement/promotion, and items that were not part of a promotion (e.g., that a user searched for or selected instead of a promoted item).

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one embodiment, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides details of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by a machine learning item availability model 316, the contents of the order, the inventory of the warehouses, and the proximity to the delivery location. The shopper management engine 310 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a customer database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfillment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

In some embodiments, the order fulfillment engine 306 may also identify items in an order that are unavailable (or are likely to be unavailable) and may suggest replacement items (e.g., as substitutes or alternatives) to the user if the ordered item is unavailable to be fulfilled by the picker. This determination may be made using a trained item availability model (described below), which outputs a likelihood that an item is available for fulfillment at a location where the order is to be fulfilled, and applying a threshold to the prediction or some other criteria for declaring that the item is unavailable. The online concierge system 102 receives a delivery order from a user through the CMA 206. The order identifies one or more items the user 204 seeks to purchase via the online concierge system 102. In some embodiments, the order also identifies a delivery location where the identified one or more items are to be delivered. The order may also identify a warehouse from which the identified one or more items are to be obtained. One or more of the items included in the order may have limited inventory at the warehouse identified by the order. To account for an item included in the order being unavailable at the warehouse identified by the order, the online concierge system 102 allows the user 204 to specify a replacement item for an item in the order, authorizing a shopper 208 to obtain the replacement item if the item is unavailable at the warehouse identified by the order.

Replacement items may be suggested when a shopper 208 identifies that the ordered item is not available or may be suggested to the ordering user when the ordered items have a substantial likelihood of being unavailable based, e.g., on the output of the machine learning item availability model 316 (discussed below). For example, an item may be suggested for replacement when the machine learning item availability model 316 predicts a low (or no) availability for the ordered item or has a relatively low confidence score in the predicted availability. The user 204 may select a suggested replacement item or search for a replacement item (e.g., via the search interface discussed above) so that the shopper 208 may obtain the user's selected replacement item if the ordered item is unavailable. Example processes for suggesting replacement items to the user are further discussed in FIGS. 5-7.

Machine Learning Models

The online concierge system 102 further includes a machine learning item availability model 316, a modeling engine 318, and training datasets 320. The modeling engine 318 uses the training datasets 320 to generate the machine learning item availability model 316. The machine learning item availability model 316 can learn from the training datasets 320, rather than follow only explicitly programmed instructions. The inventory management engine 302, order fulfillment engine 306, and/or shopper management engine 310 can use the machine learning item availability model 316 to determine a probability that an item is available at a warehouse 210. The machine learning item availability model 316 may be used to predict item availability for items being displayed to or selected by a user or included in received delivery orders. A single machine learning item availability model 316 is used to predict the availability of any number of items in some embodiments.

Additional machine learning models may also be used by the online concierge system 102 that may also have respective data in training datasets 320. For example, embodiments include machine learning models that may be used for determining suggested replacement items for an ordered item as further discussed in FIGS. 5-7.

The machine learning item availability model 316 can be configured to receive as inputs information about an item, the warehouse for picking the item, and the time for picking the item. The machine learning item availability model 316 may be adapted to receive any information that the modeling engine 318 identifies as indicators of item availability. At minimum, the machine learning item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the item availability model 316.

The machine learning item availability model 316 contains a set of functions generated by the modeling engine 318 from the training datasets 320 that relate the item, warehouse, and timing information, and/or any other relevant inputs, to the probability that the item is available at a warehouse. Thus, for a given item-warehouse pair, the machine learning item availability model 316 outputs a probability that the item is available at the warehouse. The machine learning item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine learning item availability model 316 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 316 may be updated and adapted following retraining with new training datasets 320. The machine learning item availability model 316 may be any machine learning model, such as a neural network, boosted tree, gradient boosted tree or random forest model. In some examples, the machine learning item availability model 316 is generated from the XGBoost algorithm.

The item probability generated by the machine learning item availability model 316 may be used to determine instructions delivered to the user 204 and/or shopper 208, as described in further detail below.

The training datasets 320 relate a variety of different factors to known item availabilities from the outcomes of previous delivery orders (e.g., if an item was previously found or previously unavailable). The training datasets 320 include the items included in previous delivery orders, whether the items in the previous delivery orders were picked, warehouses associated with the previous delivery orders, and a variety of characteristics associated with each of the items (which may be obtained from the inventory database 304). Each piece of data in the training datasets 320 includes the outcome of a previous delivery order (e.g., if the item was picked or not). The item characteristics may be determined by the machine learning item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine learning item availability model 316 may weight these factors differently, where the weights are a result of a "learning" or training process on the training datasets 320. The training datasets 320 are very large datasets taken across a wide cross section of warehouses, shoppers, items, warehouses, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are obtained from historic delivery order information. The training datasets 320 are used to train the machine learning item availability model 316. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

Machine Learning Factors

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of items or restocking shipments may be received on particular days. In some embodiments, training datasets 320 include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between this time information and item availability are determined by the modeling engine 318 training a machine learning model with the training datasets 320, producing the machine learning item availability model 316.

The training datasets 320 include item characteristics. In some examples, the item characteristics include a department associated with the item. For example, if the item is yogurt, it is associated with the dairy department. The department may be the bakery, beverage, nonfood, and pharmacy, produce, floral, deli, prepared foods, meat, seafood, dairy, or any other department or categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 302. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine learning model with the training datasets 320, producing the machine learning item availability model 316.

The training datasets 320 may include additional item characteristics that affect the item availability and can therefore be used to build the machine learning item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine learning item availability model 316.

Customer Mobile Application

Figure 4A:
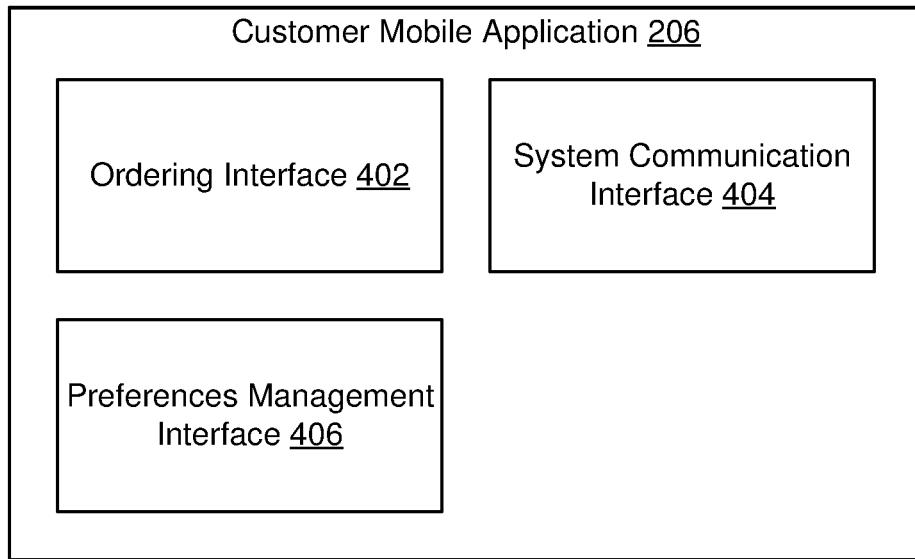
FIG. 4A is a diagram of a customer mobile application (CMA), according to one embodiment.

FIG. 4A is a diagram of the customer mobile application (CMA) 206, according to one embodiment. The CMA 206 includes an ordering interface 402, which provides an interactive interface with which the user 204 can browse through and select products and place an order. The CMA 206 also includes a system communication interface 404 which, among other functions, receives inventory information from the online concierge system 102 and transmits order information to the online concierge system 102. The CMA 206 also includes a preferences management interface 406 which allows the user 204 to manage basic information associated with his/her account, such as his/her home address and payment instruments. The preferences management interface 406 may also allow the user to manage other details such as his/her favorite or preferred warehouses 210, preferred delivery times, special instructions for delivery, and so on.

Shopper Mobile Application

Figure 4B:
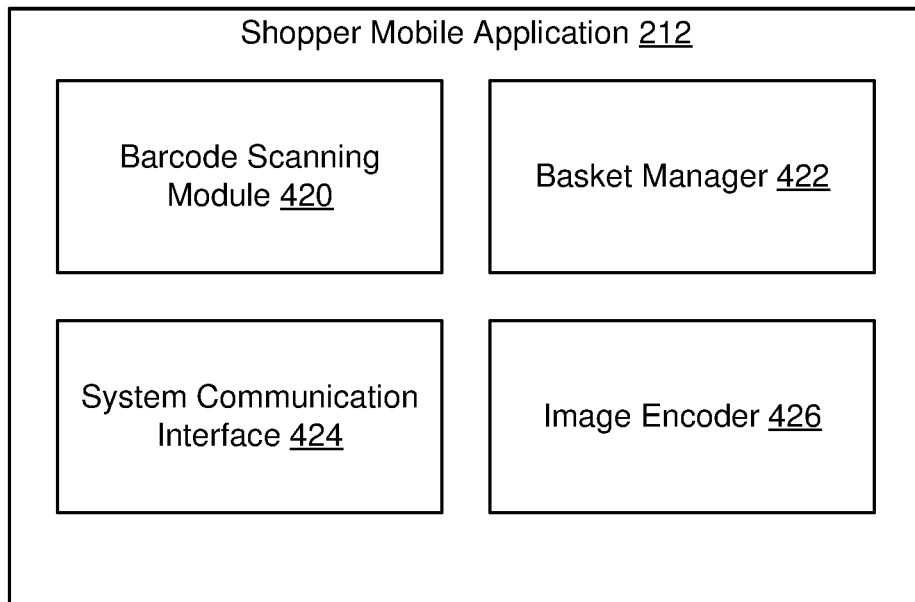
FIG. 4B is a diagram of a shopper mobile application (SMA), according to one embodiment.

FIG. 4B is a diagram of the shopper mobile application (SMA) 212, according to one embodiment. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 208 to manually enter information describing an item (such as its serial number, SKU, quantity and/or weight) if a barcode is not available to be scanned. SMA 212 also includes a basket manager 422 which maintains a running record of items collected by the shopper 208 for purchase at a warehouse 210. This running record of items is commonly known as a "basket." In one embodiment, the barcode scanning module 420 transmits information describing each item (such as its cost, quantity, weight, etc.) to the basket manager 422, which updates its basket accordingly. The SMA 212 also includes a system communication interface 424 which interacts with the online concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code which can then be scanned by an employee of the warehouse 210 at check-out.

Suggesting Replacements for Ordered Items

Figure 5:
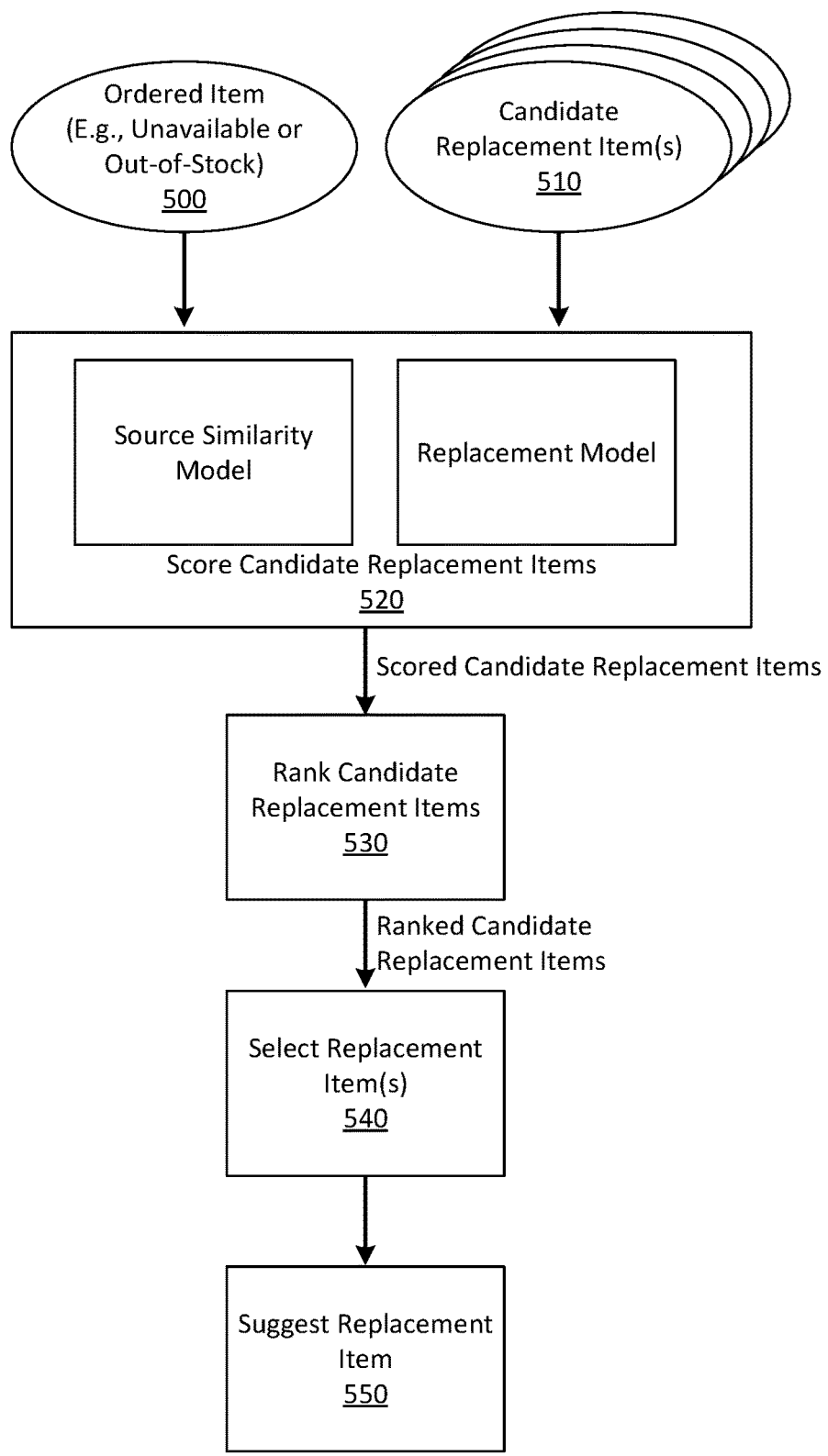
FIG. 5 is a flowchart for identifying a replacement item to suggest to a user for an ordered item included in an order, according to one embodiment.

FIG. 5 is a flowchart for identifying a replacement item for an ordered item included in an order recommended to a user, according to one embodiment. In various embodiments, the flow includes different or additional steps than those described in conjunction with FIG. 5. Further, in some embodiments, the depicted steps may be performed in different orders than the order described in conjunction with FIG. 5. The method described in conjunction with FIG. 5 may be carried out by the online concierge system 102 in various embodiments, e.g., by the order fulfillment engine 306.

As discussed above, a replacement item may be suggested (e.g., the system may perform the process/flow of FIG. 5) when an ordered item from a user's order is either not available or predicted not to be available, which may be based on the availability prediction and/or confidence score of the machine learning item availability model 316. For an ordered item that may be unavailable 510, a set of initial items may be identified that are evaluated to be suggested replacements for the ordered item. These are designated as a set of candidate replacement items 510. The candidate replacement items 510 may then be scored 520 for the determination of one or more candidate replacement items 510 to be suggested 550 to the user as a replacement item for the ordered item if the ordered item 500 cannot be fulfilled.

The set of candidate replacement items 510 may be determined in any suitable way and represent the items that are eligible to replace the ordered item 500. For example, in some embodiments the set of candidate replacement items 510 may include all items available at the warehouse(s) used to fulfill the order. In some embodiments, as further discussed below, the replacement items may be selected with an auction that incorporates a bid from an advertiser, in which case the candidate replacement items 510 may include items for which there is an associated bid.

Additionally or as an alternative, the candidate replacement items 510 may also be based on the ordered item 500, such that the candidate replacement items 510 may include items that have previously been purchased as a replacement for the ordered item, or may include items that are similar to the ordered item 500, for example, items that are in the same department, section, or aisle of a warehouse, are of the same type (e.g., have the same categorization at an item taxonomy level(s)), or may have a similar item embedding (e.g., the item embedding used for item queries). The number of candidate replacement items 510 may also be increased or decreased according to the available computing resources for scoring and selecting the candidate replacement items as discussed below. As such, in general, selection of the candidate replacement items 510 may be a relatively computationally inexpensive process, as further scoring and selection may be performed by the scoring step 520.

Each of the candidate replacement items 510 is then scored 520 to determine a total score of the candidate replacement item for selection as a suggested recommendation. The scoring 520 may include the application of one or more computer models to score the candidate replacement item 510 according to one or more factors. The scores may be combined in various ways to determine the total score, and in some embodiments the scores may have a value from zero to one, such that the scores reflecting different factors may be multiplied together to determine the total score.

The scores may include a replacement score generated by a replacement model and a source similarity score generated by a source similarity model. The replacement score may indicate the likelihood that the candidate replacement item would be selected by the user as a replacement for the ordered item, based, e.g., on a similarity of the ordered item to the candidate replacement item. The replacement score alone may be ineffective to account for item source differences in user preferences. An item's source may indicate its associated brand, manufacturer, company, etc., and may generally reflect a price, quality, style, consistency, or other set of characteristics that may otherwise be difficult to characterize as item characteristics. For example, a user may have selected a chocolate ice cream from a first source (e.g., from one manufacturer/brand) as an ordered item, and a chocolate ice cream from a different, second source (e.g., from another manufacturer/brand) may score highly in the replacement score factor given the similarity of item type and flavor. However, the user may prefer to replace the ordered item with another item associated with the first source (or a different but similar source), such as an ice cream of another flavor or another product type altogether rather than an item having the same item type and flavor from another, dissimilar source. Scoring based on replacement score alone may insufficiently account for this user-source preference.

In addition, suggesting replacement items with different sources may provide a poor experience for the provider (i.e., the source) of the ordered item, whose product may now be used to suggest a competitor's product. Further, there may be situations in which the items selected by the user are selected as a result of advertising for the ordered product (e.g., as discussed above), in which case it may be beneficial to preference the same source as the advertised source rather than another source when offering a replacement. The source similarity score may thus account for these preferences, directly encouraging source similarity for the replacement item and providing a way to measure source similarity e.g., as perceived by user source-selection preferences, and allowing (but discouraging) the selection of dissimilar source in the suggestion of a replacement item. The source similarity score may thus indicate a similarity between a source of the ordered item and a source of the candidate replacement item and is further discussed with respect to FIGS. 6 and 7.

The replacement score may be determined in a variety of ways and varies according to the particular embodiment. In one embodiment, the candidate replacement item may be scored with respect to the ordered item based on the frequency that the candidate replacement item is purchased as a replacement. The frequency may be based, for example, on a directed graph between items, in which connections may represent items selected as replacements for other items. The replacement score may also be based on the similarity of item embeddings, such as a distance (e.g., a cosine similarity or Euclidean distance) between an embedding of the ordered item 500 and an embedding of the candidate replacement item 510 in an embedding space.

The replacement model may also include sub-components that score candidate replacement items in different ways, which may be combined with an ensemble model. The replacement model may be trained to optimize various metrics and may be treated as a positive training data item acceptance of a suggested replacement item by a user and as a negative training data item rejection of a suggested replacement item (e.g., the selection of an alternate replacement item). The replacement model may also be optimized based on additional metrics such as total order value, approval rate of the order process, ranking accuracy, precision, and other metrics for the efficacy of the suggested replacement items. The training data for the replacement model may also be pruned to remove training replacement items that may have a high number of replacement attempts.

In one embodiment, the replacement model includes two submodels: a heuristic model and an item feature model. These models may be used alternatively or in combination (e.g., combined with an ensemble layer). The heuristic model may be used for items having a large amount of user engagement data, such that the frequency that the user accepts the replacement item when suggested may be more directly determined from previous instances that the candidate replacement item was suggested to the user. The heuristic model may thus indicate the acceptance rate of the candidate replacement item 510 when suggested as a replacement for the ordered item 500, and may be based, e.g., on a directed graph of replacement items as discussed above.

The item feature model may predict a replacement rate based on various features such as item characteristics, user characteristics and/or context features (e.g., describing other items in the order). The item feature model may thus be more suited for items with relatively less data for directly determining an acceptance rate. The item feature model may receive features noted above, such as various item characteristics (e.g., aisle, department, dietary aspects (kosher, gluten, fat-free, etc.), description, type, product, brand, price, taxonomy, etc.) for the ordered item 500 and for the candidate replacement item 510 and apply one or more trained computer model layers to predict the likely replacement rate for the candidate replacement item 510 for the ordered item 500. In one embodiment, the item feature model of the replacement model may use the item embeddings for the items to reflect these item-centric features and use them in conjunction with context features, user/order features, etc. to score the candidate replacement item. In one embodiment, the item embeddings are combined with a Siamese network to determine the replacement score. As noted above, the replacement score may be optimized based on historical training data for users' replacement item selections.

In some embodiments, the candidate replacement items 510 may be filtered based on the replacement score, such that candidate replacement items below a threshold replacement score may be removed and are not considered to be suggested to the user as a replacement item. In some embodiments, the candidate replacement items 510 are initially scored by the replacement model to determine respective replacement scores, filtered based on the replacement scores, and the remaining candidate replacement items are applied to a source similarity model for determining the source similarity score. This may prevent poorly performing candidate replacement items from being suggested even where the source similarity score and/or other scoring factors may be high. The value for the threshold replacement score may be set to select a number of items to be further processed, or may be set empirically based on the precision/recall of suggested replacement items and the frequency that the threshold removes items that may otherwise have been selected by users.

As noted above, the various factors may then be combined to yield a total score for each candidate replacement item. In some embodiments, the total score may also include an associated bid from an advertiser of the candidate replacement item 510, such that the replacement items are selected based on an auction (e.g., a second-price auction). In this circumstance, the source similarity model may decrease the likelihood of a dissimilar source from being suggested to a user by effectively increasing the "cost" of a competing source from being recommended to the user. As items from the same source may generally have a high source similarity score, the candidate replacement items from the same source may thus be preferred for replacement. In some embodiments, the source similarity score, replacement score, and applicable other scores may be applied as modifiers to the associated bid of the candidate replacement item for the total score used in the auction. In one embodiment, the total score is the bid for the candidate replacement item multiplied by the source similarity score and the replacement score. As such, when the source similarity score and replacement score have a range of values between zero and one, the bid may be modified to encourage high-quality replacements (via the replacement score) from the same or similar source (via the source similarity score). Although an auction may be used for the replacement items, this approach prevents high-value bids for items with relatively low replacement likelihood and/or low source similarity from significantly degrading the user experience by displacing candidate replacement items with high replacement scores and source similarity.

In one embodiment, the source similarity score may be selectively applied to the total score. In this embodiment, the source similarity score may be applied when the ordered item was previously advertised to the user, such that the selection by the user of the ordered item is associated with a value for the promotion of the ordered item by an advertiser. In this instance, the source similarity score may be applied to encourage the suggestion of replacement items consistent with the originally-ordered source (e.g., a brand) that was promoted by the advertiser. When the ordered item is not associated with a promotion, in this embodiment the source similarity score may not be applied, such that the replacement score (and if applicable, a bid for the candidate replacement item) may be used, such that different sources may not be penalized.

After the candidate replacement items 510 are scored 520, the candidate replacement items 510 may then be ranked 530 and then selected 540 according to the score for selection of one or more candidate replacement items as the replacement items to be suggested 550 to the user. The selected replacement items may be transmitted from the online concierge system 102 to the user's device 110, which causes the device 110 to present the selected replacement items to the user in a user interface of the CMA 206 and then indicate that an item of the selected replacement items may be used to replace the ordered item 500. In some embodiments, the user may also use the interface to search for another item to be the replacement item for the ordered item 500 if the ordered item 500 is unavailable. The selection of the user of the suggested replacement item(s) may be used as training data for further refining the computer models in further training, such that selected items by the user may be used as positive training examples, while items that were presented but not selected by the user may be considered negative training examples.

Figure 6:
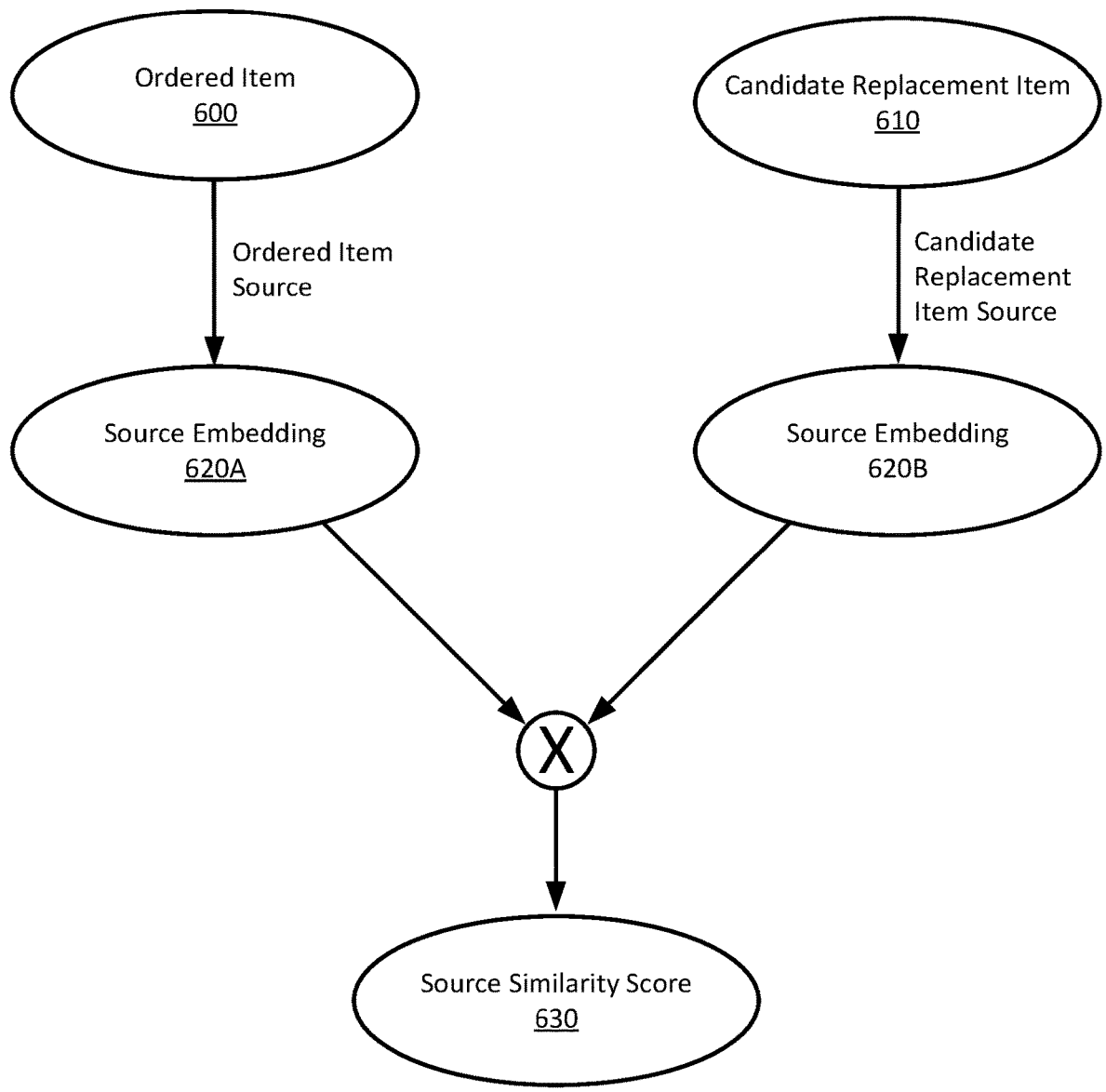
FIG. 6 shows one example for determining a source similarity score for an ordered item and a candidate replacement item, according to one embodiment.

FIG. 6 shows one example for determining a source similarity score 630 for an ordered item 600 and a candidate replacement item 610, according to one embodiment. In this embodiment, the source similarity score 630 may be determined based on respective source embeddings 620 associated with the ordered item 600 and the candidate replacement item 610. The source similarity score 630 in various embodiments may be determined by other approaches than respective source embeddings as discussed in FIGS. 6 and 7. In this example, the source associated with each item may be identified, and an embedding of the respective sources identified (e.g., retrieved or determined) as a source embedding 620A and a source embedding 620B. The source embeddings may represent an embedding of the respective sources in an embedding space, which may be a multi-dimensional latent space in which the position of sources and distance between them may indicate the similarity of the sources. The source similarity score 630 may thus be determined based on e.g., a cosine similarity or another distance metric between the source embedding 620A and 620B. For a candidate replacement item 610 having the same source as the ordered item 600, the source embeddings may be identical, such that the source similarity score is the best possible (e.g., 1 for cosine similarity, or 0 for Euclidean distance).

In one embodiment, a source embedding may be determined from the items associated with a source and the respective item embeddings of those items (e.g., as may be used for characterizing the items for a search query or for other purposes). The source embedding in this embodiment may be determined by combining (as an average or weighted combination (e.g., of item purchase frequency) or other means) the item embeddings of items associated with the source.

The items associated with a source may vary depending on a particular type of source used in different embodiments. For example, the source in one embodiment may be a particular brand, such that items affiliated with that brand may be considered associated with that source. In other embodiments, the source may refer to a given company, manufacturer, or set of affiliated brands, such that items having different brands may nonetheless be considered affiliated with the same source.

Figure 7:
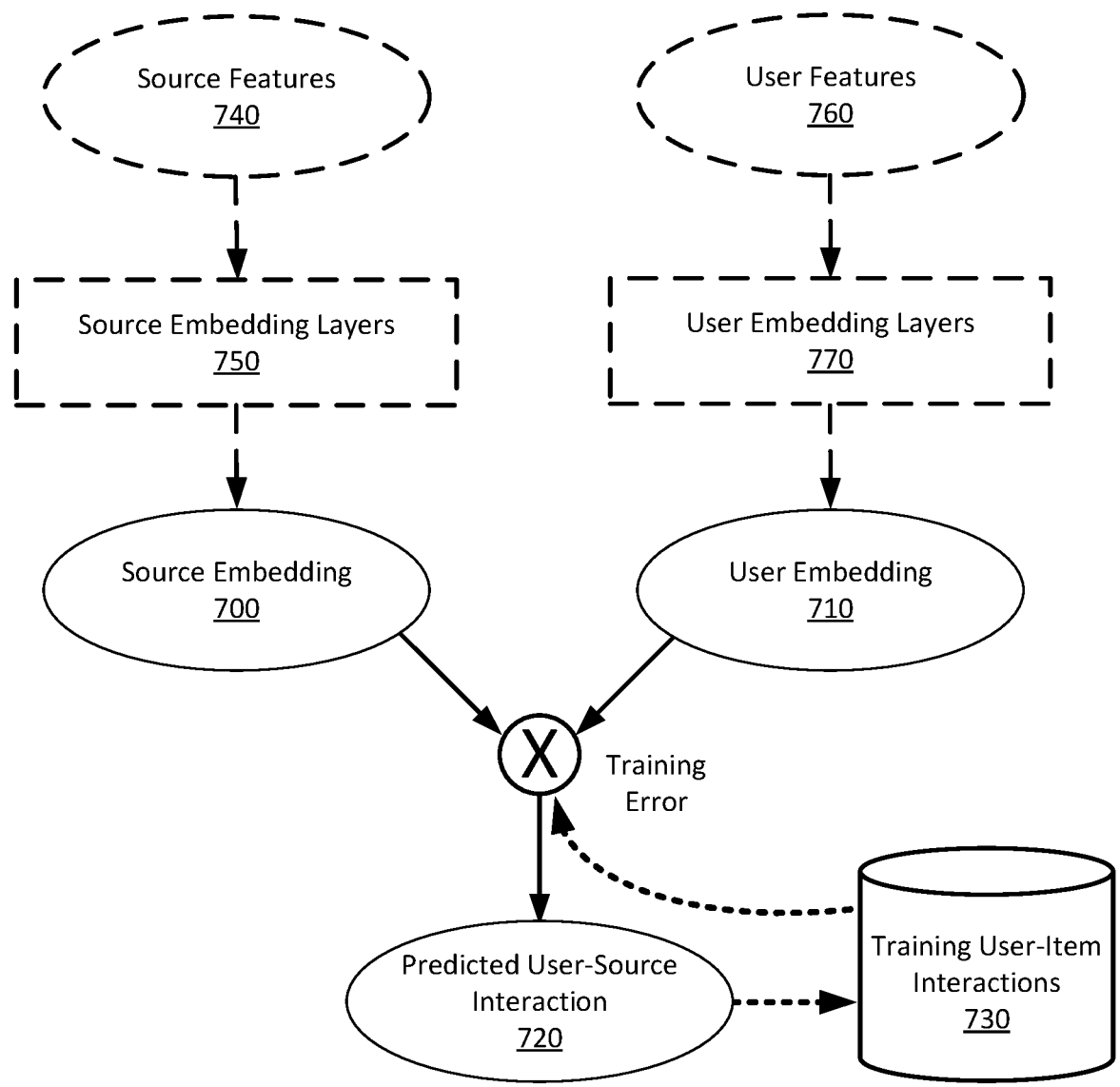
FIG. 7 shows an example flow for determining a source embedding, according to one embodiment.

FIG. 7 shows an example flow for determining a source embedding, according to one embodiment. The example of FIG. 7 provides another way for determining a source embedding. In this example, the source embedding 700 (i.e., for a particular source) may be trained based on user-item interactions with items associated with the source. These may also be referred to as user-source interactions (although the interaction itself is with a particular item). The source embedding 700 may be trained such that the source embedding 700 and user embedding 710 are evaluated to a predicted user-source interaction 720 that may be compared with a set of training user-item interactions 730. The predicted user-source interaction 720 may be determined based on a distance metric in a latent space of the source embedding 700 and the user embedding 710, such as a cosine similarity. The predicted user-source interaction 720 may thus represent the distance between the user embedding 710 and source embedding 700, such that the more likely a predicted interaction between a particular source embedding 700 and user embedding 710, the "closer" the embeddings are in the embedding space according to the distance metric.

The training user-item interactions 730 may include interactions between users and items associated with the sources, such that the items of each source are used with respect to training that source's source embedding 700. The set of source embeddings and user embeddings may be jointly trained such that the position of the source embeddings with respect to one another may also be used to reflect the similarity of the respective sources to determine a source similarity score as discussed above. The interactions used as the training user-item interactions 730 may be various types of interactions, such as including an item in an order, accessing information about an item, adding the item to a cart, selecting the item as a replacement, etc. As such, in one embodiment the user-item interactions (i.e., grouped as user-source interactions) for buying an item are labeled as positive user-item interactions, and non-purchase user-item interactions are labeled as negative user-item interactions, such that the positive user-item interactions have a training value of one and the negative user-item interactions have a training value of zero. During training, a training error of the predicted user-source interaction 720 is determined by comparing the predicted user-source interaction with the training value. The training error may then be propagated to the source embedding 700 and user embedding 710 to modify the respective embeddings.

In this case, the embeddings and model are thus trained such that the distance (e.g., a dot product or cosine similarity) of a user embedding and source embedding pair is high when the user performed a desired action (e.g., in the training user-source interactions). In other embodiments, the user-source interactions may be categorized in a hierarchy of intent signals, such that the embeddings may be trained with a learning-to-rank error. For example, a user interaction of order/purchase is higher in the hierarchy than adding an item to a cart, which may be higher than clicking on an item. In the learning-to-rank approach, the embeddings are trained to reflect similar relative distances between the hierarchy of interactions, such that the higher hierarchy interactions are reflected in closer distances of a user-source embedding pair relative to lower hierarchy interactions (e.g., having farther distances for respective user-source embedding pairs).

In one embodiment, the source embedding 700 may thus be a learned position in the latent space, such that each source embedding is learned during the training. In another embodiment, the source embedding 700 and, optionally, the user embedding 710, is output by a set of learned computer model layers. In the example of FIG. 7, the source embedding 700 may be generated by a set of source embedding layers 750 applied to a set of source features 740, and the user embedding 710 may be generated by a set of user embedding layers 770 applied to a set of user features 760. The source features 740 and user features 760 may include various characteristics and aspects of the respective source and users that are suitable for determining the source embedding 700 and user embedding 710. For example, the source features in one embodiment may be a value determined based on the item embeddings of the items associated with the source, such as an average or weighted average of the item embeddings. The source features 740 may also include a description of the source, the categories of items associated with the source, additional features derived from items associated with the source, and so forth.

As such, the embeddings may be generated by a "two-tower" model structure, such that the respective embeddings may be determined for a particular source or user based on the respective source features 740 or user features 760. The training error may thus propagate an error to modify parameters of the respective source embedding layers 750 or user embedding layers 770. In this architecture, a source embedding 700 may be generated for a source with relatively little (or no) user-item interaction, as the source features 740 for the source may be used to generate the source embedding 700 based on the trained source embedding layers 750. This approach provides another way for effective source embeddings that may be used for source similarity scores. The source embeddings of FIGS. 6 and 7 may thus reflect actual user behavior and enable the source similarity score to effectively reflect similarity of sources as perceived by users given actual user behavior.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method performed by one or more computer processors, the method comprising:
  receiving an order comprising a set of items for a user;
  identifying an ordered item from the set of items for suggesting a replacement item to the user;
  determining a set of candidate replacement items for the ordered item;
  determining a total score for each candidate replacement item in the set of candidate replacement items by:
    determining a replacement score for the candidate replacement item indicating a likelihood that the candidate replacement item would be selected by the user as a replacement for the ordered item,
    determining a source similarity score indicating a similarity between a first source of the ordered item and a second source of the candidate replacement item, wherein determining the source similarity score comprises:
      accessing a first source embedding for the first source, wherein the first source embedding is generated by source embedding layers of a machine-learning model, wherein the machine-learning model comprises the source embedding layers and user embedding layers and is trained to predict user-source interactions based on user data and source feature data associated with a source, wherein the machine-learning model is trained based on training examples comprising source features associated with a source for input to the source embedding layers, user data describing a user for input to the user embedding layers, and a label indicating whether the user interacted with the source, accessing a second source embedding for the second source, wherein the second source embedding is generated by the source embedding layers of the machine-learning model, and computing a difference between the first source embedding and the second source embedding, and combining the replacement score and the source similarity score to generate the total score;

selecting one or more candidate replacement items based on the total scores; and transmitting information identifying the one or more selected replacement items for display to the user.

2. The method of claim 1, wherein identifying the ordered item from the set of items for suggesting a replacement item to the user comprises:

applying an item availability model that is trained to predict a likelihood that the ordered item is available at a location for fulfilling the order, the item availability model trained based on training data that describes historical fulfillment of previous orders and availability of items in the previous orders; and declaring the ordered item to be unavailable based on the predicted likelihood that the ordered item is available.

3. The method of claim 1, wherein determining the replacement score for each candidate replacement item comprises:

applying a trained replacement model to a set of features describing the candidate replacement item, the trained replacement model configured to output a likelihood that the candidate replacement item would be selected by the user as a replacement for the ordered item, wherein the replacement model is trained based on training data that describes historical suggestions of replacement items to other users and previous user responses thereto.

4. The method of claim 1, wherein determining the source similarity score comprises:

generating the first source embedding associated with the first source based on one or more item embeddings of products associated with the first source; and generating the second source embedding associated with the second source based on one or more item embeddings of products associated with the second source.

5. The method of claim 1, wherein combining the replacement score and the source similarity score to generate the total score comprises computing a weighted sum of the replacement score and the source similarity score.

6. The method of claim 1, wherein combining the replacement score and the source similarity score to generate the total score comprises applying a function that decreases as the source similarity score decreases.

7. The method of claim 1, wherein determining a total score for each candidate replacement item further comprises adjusting the total score by a bid value associated with the respective candidate replacement item.

8. The method of claim 7, wherein adjusting the total score by a bid value comprises multiplying the bid value by the similarity score.

9. A computer program product comprising a non-transitory computer readable storage medium having instructions encoded thereon that, when executed by a processor, cause the processor to perform steps comprising:

receiving an order comprising a set of items for a user;

identifying an ordered item from the set of items for suggesting a replacement item to the user;

determining a set of candidate replacement items for the ordered item;

determining a total score for each candidate replacement item in the set of candidate replacement items by:

determining a replacement score for the candidate replacement item indicating a likelihood that the candidate replacement item would be selected by the user as a replacement for the ordered item, determining a source similarity score indicating a similarity between a first source of the ordered item and a second source of the candidate replacement item, wherein determining the source similarity score comprises:

accessing a first source embedding for the first source, wherein the first source embedding is generated by source embedding layers of a machine-learning model, wherein the machine-learning model comprises the source embedding layers and user embedding layers and is trained to predict user-source interactions based on user data and source feature data associated with a source, wherein the machine-learning model is trained based on training examples comprising source features associated with a source for input to the source embedding layers, user data describing a user for input to the user embedding layers, and a label indicating whether the user interacted with the source, accessing a second source embedding for the second source, wherein the second source embedding is generated by the source embedding layers of the machine-learning model, and computing a difference between the first source embedding and the second source embedding, and combining the replacement score and the source similarity score to generate the total score;

selecting one or more candidate replacement items based on the total scores; and transmitting information identifying the one or more selected replacement items for display to the user.

10. The computer program product of claim 9, wherein identifying the ordered item from the set of items for suggesting a replacement item to the user comprises:

applying an item availability model that is trained to predict a likelihood that the ordered item is available at a location for fulfilling the order, the item availability model trained based on training data that describes historical fulfillment of previous orders and availability of items in the previous orders; and declaring the ordered item to be unavailable based on the predicted likelihood that the ordered item is available.

11. The computer program product of claim 9, wherein determining the replacement score for each candidate replacement item comprises:

applying a trained replacement model to a set of features describing the candidate replacement item, the trained replacement model configured to output a likelihood that the candidate replacement item would be selected by the user as a replacement for the ordered item,
wherein the replacement model is trained based on training data that describes historical suggestions of replacement items to other users and previous user responses thereto.

12. The computer program product of claim 9, wherein determining the source similarity score comprises:
generating the first source embedding associated with the first source based on one or more item embeddings of products associated with the first source; and
generating the second source embedding associated with the second source based on one or more item embeddings of products associated with the second source.

13. The computer program product of claim 12, wherein the first source embedding and the second source embedding are jointly trained with a set of user embeddings based on a training set of user-source interactions of users interacting with items having associated sources.

14. The computer program product of claim 9, wherein combining the replacement score and the source similarity score to generate the total score comprises applying a function that decreases as the source similarity score decreases.

15. The computer program product of claim 9, wherein determining a total score for each candidate replacement item further comprises adjusting the total score by a bid value associated with the respective candidate replacement item.

16. The computer program product of claim 15, wherein adjusting the total score by a bid value comprises multiplying the bid value by the similarity score.

17. A system comprising:
one or more processors; and
a non-transitory computer readable storage medium having instructions encoded thereon that, when executed by the one or more processors, cause the one or more processors to perform steps comprising:
receiving an order comprising a set of items for a user;
identifying an ordered item from the set of items for suggesting a replacement item to the user;
determining a set of candidate replacement items for the ordered item;
determining a total score for each candidate replacement item in the set of candidate replacement items by:
determining a replacement score for the candidate replacement item indicating a likelihood that the candidate replacement item would be selected by the user as a replacement for the ordered item,
determining a source similarity score indicating a similarity between a first source of the ordered item and a second source of the candidate replacement item, wherein determining the source similarity score comprises:
accessing a first source embedding for the first source, wherein the first source embedding is generated by source embedding layers of a machine-learning model, wherein the machine-learning model comprises the source embedding layers and user embedding layers and is trained to predict user-source interactions based on user data and source feature data associated with a source, wherein the machine-learning model is trained based on training examples comprising source features associated with a source for input to the source embedding layers, user data describing a user for input to the user embedding layers, and a label indicating whether the user interacted with the source,
accessing a second source embedding for the second source, wherein the second source embedding is generated by the source embedding layers of the machine-learning model, and
computing a difference between the first source embedding and the second source embedding, and
combining the replacement score and the source similarity score to generate the total score;
selecting one or more candidate replacement items based on the total scores; and
transmitting information identifying the one or more selected replacement items for display to the user.

18. The system of claim 17, wherein identifying the ordered item from the set of items for suggesting a replacement item to the user comprises:
applying an item availability model that is trained to predict a likelihood that the ordered item is available at a location for fulfilling the order, the item availability model trained based on training data that describes historical fulfillment of previous orders and availability of items in the previous orders; and
declaring the ordered item to be unavailable based on the predicted likelihood that the ordered item is available.

* * * * *